(12) United States Patent
Ehrler et al.

(10) Patent No.: US 7,263,900 B2
(45) Date of Patent: Sep. 4, 2007

(54) VOLUMETRIC FLOW METERING DEVICE

(76) Inventors: Alois Anton Ehrler, Staigrbacher Str. 16, 74673 Mulfingen-Zaisenhausen (DE); Rainer Kramer, Papengey 15 A, 38116 Braunschweig (DE); Bodo Mickan, Comeniusstrasse 19, 38104 Braunschweig (DE)

( * ) Notice: Subject to any disclaimer, the term of this patent is extended or adjusted under 35 U.S.C. 154(b) by 95 days.

(21) Appl. No.: 10/519,660

(22) PCT Filed: Jun. 18, 2003

(86) PCT No.: PCT/EP03/06419

§ 371 (c)(1),
(2), (4) Date: Nov. 7, 2005

(87) PCT Pub. No.: WO04/001347

PCT Pub. Date: Dec. 31, 2003

(65) Prior Publication Data

US 2006/0225515 A1    Oct. 12, 2006

(30) Foreign Application Priority Data

Jun. 24, 2002  (DE) ............................. 102 28 025

(51) Int. Cl.
*G01F 1/37* (2006.01)
(52) U.S. Cl. ................................................. 73/861.52
(58) Field of Classification Search ............. 73/861.52; 137/87.04

See application file for complete search history.

(56) References Cited

U.S. PATENT DOCUMENTS

| 3,440,967 A | | 4/1969 | Pennther |
| 3,568,705 A | * | 3/1971 | Boyadjieff et al. ....... 137/87.04 |
| 4,191,094 A | * | 3/1980 | Flippo ......................... 91/506 |
| 5,106,268 A | | 4/1992 | Kawamura et al. |

FOREIGN PATENT DOCUMENTS

| EP | 0370487 A1 | 5/1990 |
| EP | 0471930 A1 | 2/1992 |

OTHER PUBLICATIONS

DE International Search Report for PCT/EP03/06419.

* cited by examiner

*Primary Examiner*—Jewel Thompson
(74) *Attorney, Agent, or Firm*—Leydig, Voit & Mayer, Ltd

(57) ABSTRACT

A metering device for producing a precisely metered volumetric flow is provided. The metering device comprises two displacement devices that are operated in phase opposition. In this case, the shifting speeds of the volumes of the displacement devices are adjusted such that no compensation flow takes place. In this state, the volumetric flow delivered to the device to be tested is identical to the volumetric flow taken in by the other displacement device from the pressure source.

15 Claims, 2 Drawing Sheets

VOLUMETRIC FLOW METERING DEVICE

FIELD OF THE INVENTION

The present invention relates to devices for delivering a defined volumetric flow of a fluid.

BACKGROUND OF THE INVENTION

The flow characteristics of nozzles, particularly nozzles used with compressible fluids, cannot be calculated precisely. To calculate the flow characteristics of a given nozzle, it is necessary to later measure the nozzle in order to determine the flow rate as a function of pressure. However, the flow characteristics need to be determined very precisely. Thus, while it is simple to measure the pressure accurately, the volumetric flow of the fluid is difficult to determine.

It is known to determine the volumetric flow of a nozzle by using fluid sources, in which the flow of a fluid arriving from a critically operated nozzle is conveyed to the nozzle to be tested by means of laminar flow elements. Although this measuring arrangement is comparatively accurate, it is not suitable as a measurement standard for calibration purposes.

BRIEF SUMMARY OF THE INVENTION

In view of the foregoing, an object of the invention is to develop a volumetric flow metering device that makes it possible to produce a very precise volumetric flow at a known pressure.

In the new device according to the invention, two displacement devices are coupled together with respect to the flow and operated in opposite directions. One displacement device takes in fluid delivered via a supply line while the other displacement device delivers fluid to the nozzle to be tested. If the speed of the displacement piston is adjusted in such a way that no fluid exchange takes place between the two displacement devices, the volumetric flow supplied to the device to be tested corresponds to the change in volume of the displacement device coupled to the device to be tested. The movement of the displacement piston can be adjusted quite accurately. This not only makes it possible to exactly predetermine the pressure, but also the volumetric flow.

The invention can have a very simple configuration if each displacement device consists of a cylinder into which a displacement piston extends from one end. The diameter of the displacement piston is smaller than the clear width of the cylinder chamber in order to prevent differences in pressure in the cylinder chambers caused by undesirable currents within the cylinder chamber that could falsify the results.

Each of the two cylinder chambers is provided with two lines, one of which serves to produce a connection to the other cylinder chamber. If applicable, it may be advantageous to lead the lines into the cylinder chamber from different ends. Pressure gauges or any type of flow sensor that operates in a qualitative manner may be used to measure the fluid exchange between the displacement devices. When using a pressure gauge, the pressure in the connecting line should be exactly as high as the pressure in the feed line. This ensures that the displacement device connected to the load or device to be tested neither takes in additional fluid nor delivers fluid back to the feed device. Instead of the pressure gauge, it is also possible to use a flow sensor, e.g., a flowmeter. This provides the advantage that no differential pressures need be measured.

The drive unit for the two displacement devices may be realized with motors that deliver an exactly predetermined rotational speed or driving speed. Stepper motors or synchronous motors are particularly suitable for this purpose.

The seals used to seal the displacement pistons or their actuating rods should generate as little friction force as possible. Their sealing effect is thereby limited.

It is advantageous that the device of the present invention can be used at low pressures of a few bar without additional measures. If the device of the invention is intended for use at high pressures, it can be entirely accommodated in a sealed housing, where the interior of this housing is pressurized to a pressure that essentially corresponds to the test pressure at which the device to be tested should operate. This makes it possible to keep the differential pressure on the seal comparatively low and to use weak seals that generate little friction force.

DETAILED DESCRIPTION OF THE INVENTION

Figure 1:
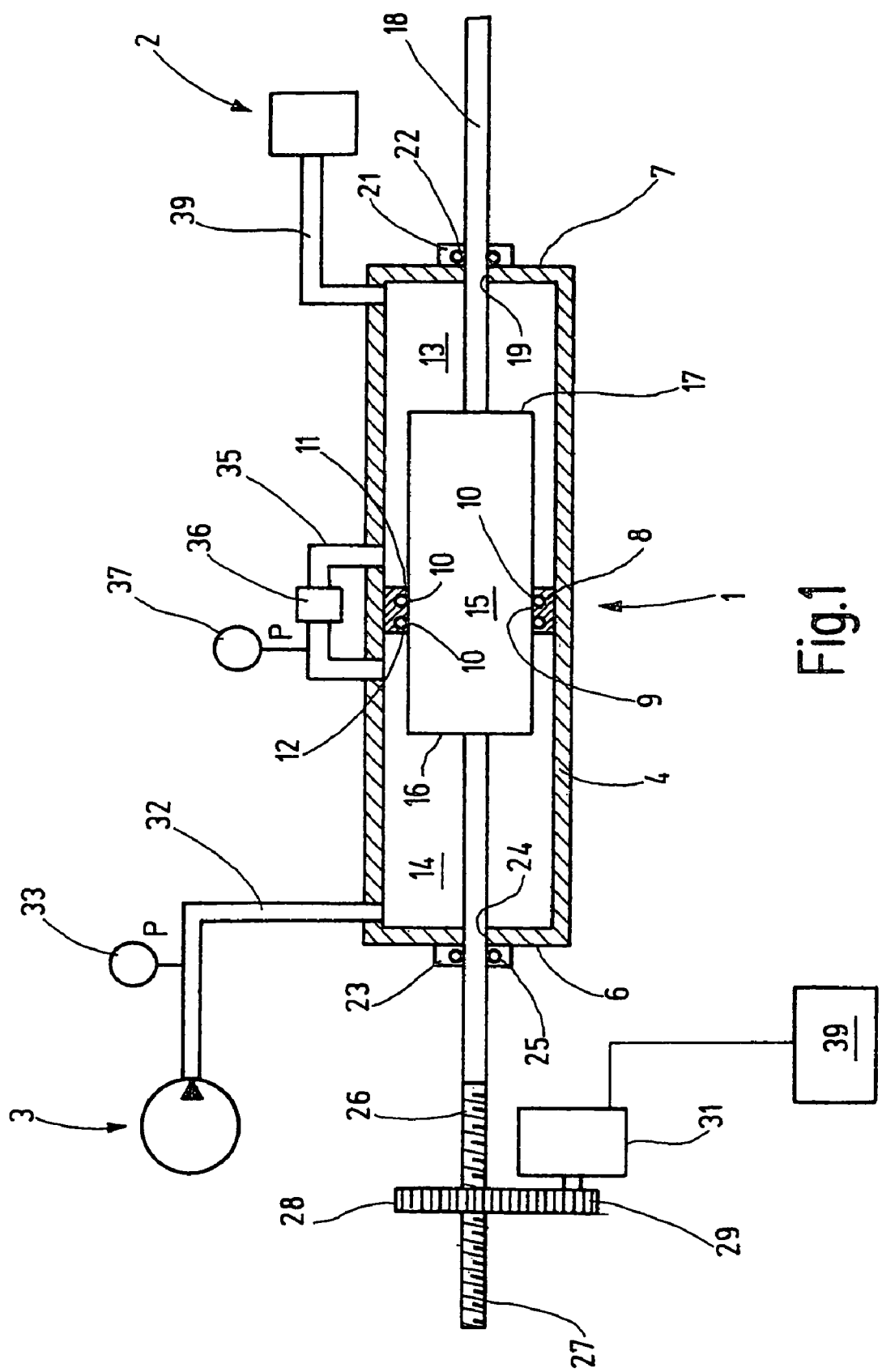
FIG. 1 is a schematic view of an exemplary volumetric flow metering device according to the invention for use at low pressures.

FIG. 1 is a highly schematic view of a volumetric flow metering device 1 that serves for delivering a precisely metered volumetric flow to a device 2 to be tested, for example, a nozzle. The volumetric flow is delivered by a fluid source 3, for example, a pump. The fluid consists of a compressible fluid such as air or another gas.

The metering device 1 comprises a cylindrical housing 4 closed at both ends by end walls 6 and 7. An annular collar 8 with a bore 9 is located approximately in the center between the two end walls 6 and 7, where the diameter of said bore is smaller than the inside diameter of the cylindrical housing 4. The bore 9 contains two ring seals 10. The annular collar 8 is limited by two annular faces 11 and 12.

The distance between face 11 and the inner side of end wall 7 is equal to the distance between face 12 and the inner side of end wall 6. This results in two identical cylinder chambers 13 and 14 separated by the annular collar 8. The ends of each cylinder chamber 13, 14 are formed by the annular collar 8 and its respective faces.

A cylindrical piston 15 displaceably extends through the bore 9 of the annular collar 8. If one imagines that this cylindrical piston is divided into two interconnected displacement pistons, one piston moves in the cylinder chamber 14 while the other piston is effective in the chamber 13. The length of the piston 15 is chosen such that it corresponds to the distance between face 12 and the inner side of end wall 7. Thus, one face 16 of the piston 15 will be flush with the face 12 when face 17 strikes end wall 7. Conversely, face 17 will be flush with face 11 when face 17 strikes the inner side of end wall 6.

A piston rod 18 starting from end wall 17 extends outwardly through a bore 19 in end wall 7. In order to seal the piston rod 18, a tubular attachment 18 is seated on end wall 7. The tubular attachment 18 contains a seal 22 that lies in a corresponding receptacle groove. The piston rod 18 is sealed with the aid of the seal 22. A similar arrangement is provided on the end wall 6. This end wall is also provided with a tubular attachment 23, a continuous bore 24 as well as a seal 25. Another piston rod 26 extends through the bore 24 and the seal 25. The diameter of the piston rod 26 is equal to the diameter of the piston rod 18. Piston rods 18 and 26 are arranged coaxially to one another and to the two cylinder chambers 13 and 14, as well as the bore 9. In this way, largely symmetrical conditions are achieved in both cylinder chambers 13 and 14.

The free end of the piston rod 26 transitions into a threaded spindle 27, onto which a gear wheel 28 is screwed. The gear wheel 28 is secured in the axial direction with the aid of suitable means, which are not illustrated in detail. The gear wheel 28 meshes with a pinion gear 29 that can be selectively set in rotation by a motor 31. The motor 31, together with the two gear wheels 29, 28 and the threaded spindle 27, forms a worm drive, which makes it possible to move the piston rod 26 and the connected piston 15 linearly back and forth.

A line 32 for connecting the cylinder chamber 14 to the pressure side of the pump 3 leads into the cylinder chamber 14 in the immediate vicinity of the end wall 6. If so required, the line 32 may be provided with a pressure gauge 33.

The device 2 to be tested is connected to the cylinder chamber 13 in a similar manner to the connection between the pump and the cylinder chamber 14. A line 34 is provided for this purpose. The line 34 terminates adjacent to and in the immediate vicinity of the inner side of the end wall 7.

A connecting line 35 that contains a flow sensor 36 terminates adjacent to both faces 11 and 12 of the annular collar 8. In addition or alternatively to the flow sensor 36, a pressure sensing element 37 may measure the pressure in the connecting line 35.

The motor 31 is a variable-speed motor, for example, a stepper motor or synchronous motors, that receives its supply voltage from a central controller 39. The flow sensor 36 is also connected to the controller 39 via an electric line that is not shown in the figures.

The operation of the illustrated arrangement is described below:

At the beginning of a measurement, the displacement piston 15 is moved to the left end position by starting the motor 31. In this position, the free volume of the cylinder chamber 14 is at a minimum, while the free volume of the chamber 13 is at a maximum. The pump 3 is now used to adjust the volumetric flow to a desired pressure that can be checked by the pressure sensor 33.

Fluid for measuring the device 2 to be tested flows from the pump 3 into the annular gap between the outer wall of the cylinder chamber 13 and the piston 14 through the line 32 and then to the connecting line 35. The connecting line 35 terminates adjacent to and in the immediate vicinity of the end wall 12. From this location, the fluid flows into the cylinder chamber 13, adjacent to and in the immediate vicinity of the end wall 11. The fluid flows to the device 2 to be tested through the cylinder chambers 13 and the line 34.

The pressure acting upon the device 2 to be tested is known in this operating position. However, the volumetric flow is still unknown. The drive motor 31 is actuated by the central controller 39 after a state of equilibrium is adjusted and all parts have reached the temperature of the fluid.

As soon as the piston 15 begins to move from left to right with reference to FIG. 1, the cylinder chamber 14 takes in additional fluid from the source 3 while the fluid contained in the cylinder chamber 13 is discharged via the device 2 to be tested. At a certain speed of the piston 15, the intake rate observed for cylinder chamber 14 will be equal to the discharge rate, whereby the cylinder chamber 13 pumps fluid to the device 2 to be tested. The compensation flow through the connecting line 35 ceases once this state is reached, i.e., the flow sensor 36 no longer measures a flow through the line 35. The controller 39 detects this state and holds the required speed of the motor 31 constant for the additional measurement.

At this time, the volumetric flow delivered to the device to be tested is known. The volumetric flow delivered to the device 2 to be tested is calculated from the speed of the piston 15 and the cross-sectional surface of the piston 15. The pressure is also known because it is identical to the pressure to which the arrangement was previously adjusted while the motor 31 was still stationary. Consequently, the metering device 1 makes it possible to deliver a known volumetric flow to the device 2 to be tested at a known pressure.

The metering ends as soon as the face 17 of piston 15 arrives at the end wall 7.

The piston rod 18 acts to compensate the volume of the piston rod 26. The conditions otherwise would be asymmetrical and falsify the measurement. Due to the use of two piston rods 18 and 26, the intake volume of the cylinder chamber 14 is exactly identical to the pumping volume of the cylinder chamber 13 when the piston 15 is displaced.

The previous description indicates that the cylinder chamber 14 with the piston 15 acts as a displacement device that operates in an intake mode while the cylinder chamber 13 with the corresponding section of the piston 15 acts as a displacement device that operates in a pumping mode. This means that two displacement devices are mechanically coupled and are driven synchronously. The illustrated embodiment has the advantages of being very compact and mechanically simple. It is also possible to spatially separate the two cylinder chambers 13 and 15 and to use two separate displacement pistons.

The movement of the piston 15 should be as uniform as possible. Any nonuniformities would manifest as fluctuations in the air volumetric flow. This is the reason the seals 22, 24 and the seals 10 in the bore 9 are the type that generate the least radial prestress possible. They are just sufficient to ensure that no leaks occur relative to the atmosphere at the desired test pressure. An absolutely tight seal is not required as long as the test pressure lies slightly above atmospheric pressure. It is sufficient if a flow resistance occurs in the region of the seals 10, 22 and 25 that is high enough to ensure that the fluid volume thereby discharged does not influence the measurement result.

Instead of using the flow sensor 36 to detect whether a compensation flow takes place through the line 35, it is also possible to use a pressure sensor 37 in connection with a flow control valve. The component 36 consists of an adjustable throttle valve in this case. The controller 39 compares the pressure measured by the pressure sensor 37 with the pressure measured by the sensor 33. When both pressures are identical, a compensation flow does not take place through the connecting line 35. With respect to the sensitivity, however, it is preferred to use a flow sensor 36. The flow sensor may consist of any type of flow sensor that makes it possible to measure even slight flows of fluid through the line 35.

It is not necessary to determine the flow direction if the speed of the motor 31 increases from zero. As soon as the flow minimum in the connecting line 35 is reached, it is sufficient to hold the speed constant. A flow in the opposite direction does not occur unless the motor 31 is accidentally operated with an excessively high speed such that the fluid is forced back through the line 35.

It is also possible to arrange a shut-off valve in the connecting line 35. The shut-off valve can be closed as soon as the above-mentioned equilibrium state is reached, since gas will no longer flow through the line 35 in any case. The use of a shut-off valve (not shown in FIG. 1) makes it possible to produce a very constant measurement, which will not be affected by random pressure fluctuations of the pump 3.

Figure 2:
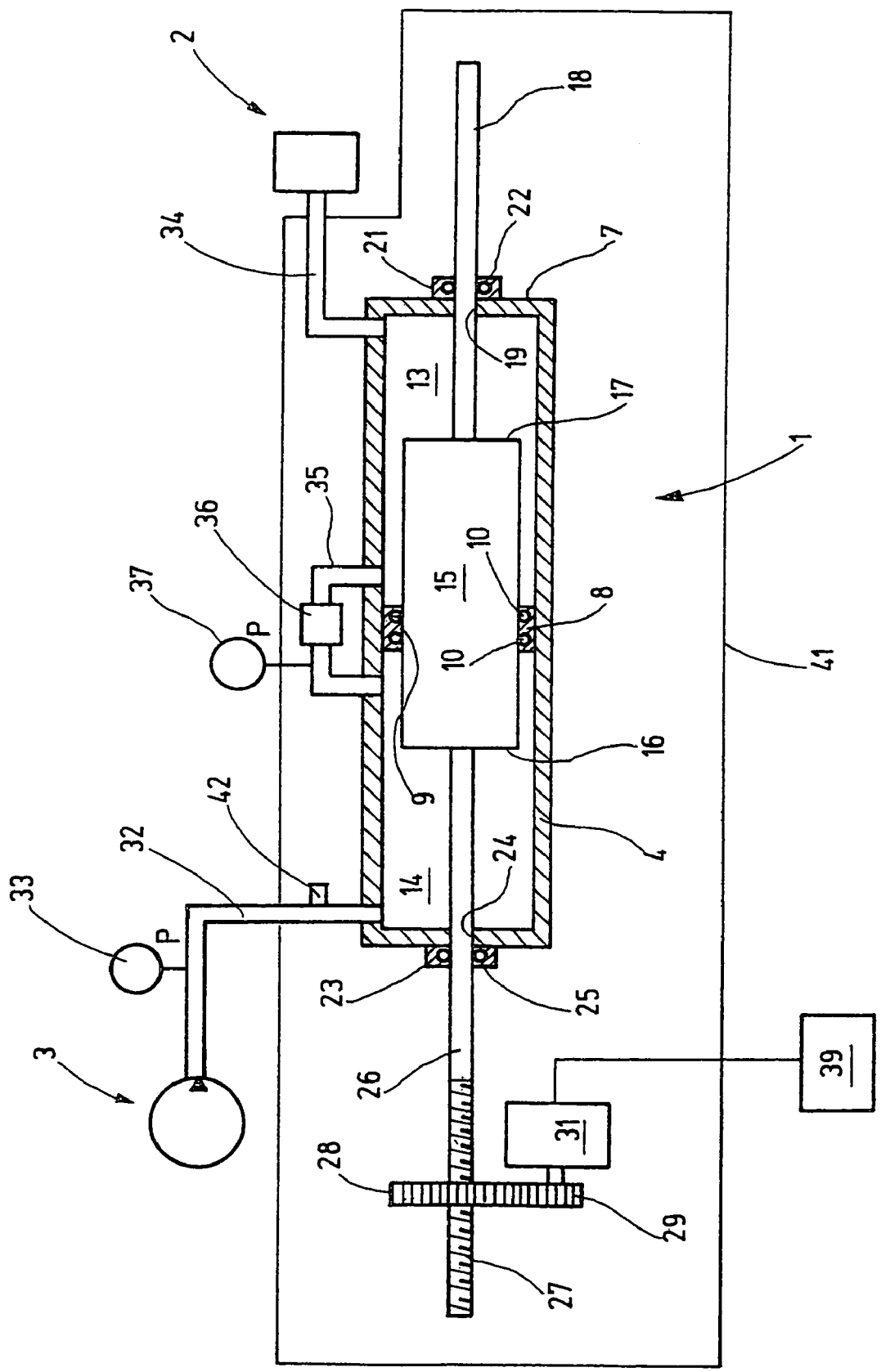
FIG. 2 is a schematic view of an exemplary volumetric flow metering device according to the invention for use at high pressures.

Instead of using the arrangement of FIG. 1 which has relatively weak seals, with higher pressures, which would cause more significant fluid losses through these seals, a further aspect of the invention can include using the more suitable arrangement according to FIG. 2 in such cases. The FIG. 2 arrangement differs from that described above in that an additionally sealed housing 41 is used to accommodate the cylinder housing 4, including the drive motor 31 and the gear consisting of the gear wheels 28 and 29. The only lines leading out of the housing are the lines 32 and 39, as well as the electric connecting lines leading to the motor 31, the flow sensor 36 and, if applicable, the pressure sensor 37. In addition, the line 32 within the housing 41 contains an outlet 42 for supplying the fluid being delivered via lines 32 to the interior of the housing 41. In this way, the pressure in the chambers 13 and 14 is identical at equilibrium while the measurement is carried out and is equal to the pressure in the outer region of the metering device 1. Consequently, leaks no longer occur through the seals 22 and 25. In other respects, the function of the device corresponds to that described above.

Another advantage of the device according to the invention is that it can be controlled to any temperature. Thus, the device is suitable for arbitrary pressures and arbitrary temperatures.

Larger volumes can also be produced for the device 2 to be tested with a known volumetric flow if the stroke of the piston 15 is extended. The only important aspect is that the connections of the lines 32, 34, 36 within the two cylinder chambers 13 and 14 do not result in any gaps relative to the piston 15 that could act as throttles. This is the reason the piston 15 must leave a significant annular gap open in both cylinder chambers 13 and 15, particularly if the device is temperature-controlled by means of the fluid flowing through the device. Excessively high pressure drops would otherwise occur when the fluid flows from the line 32 to the line 34.

When only small volumetric flows are required, the clearance spaces should be made as small as possible. This is achieved by increasing the diameter of the piston 15 and leading all lines to the respective end walls 6 and 7.

It is also practical if the fluid flows through both cylinder chambers 13 and 14 over their entire length. In this case, the incoming line arriving from the pressure source 3 leads into the region that is not contacted by the piston over the longest possible stroke of the piston. This applies in similar fashion to the outgoing line 34 in relation to the cylinder chamber 13. This is the reason both lines 32 and 34 are arranged in the immediate vicinity of the end walls 6 and 7. They may also lead into the cylinder chambers 13, 14 through the end walls. In this context, it would also be practical if the connecting line 35 led into the respective cylinder chamber at the corresponding location. However, this would disadvantageously result in an inadequate flow of the fluid through clearance spaces such that the temperature-control would become more difficult. A favorable compromise consists of leading the connecting line 35 into the cylinder chamber on either side of the annular collar 8 in its immediate vicinity. In order to improve temperature-control, it is also possible to use a group of connecting lines instead of a single connecting line 35. In this case, it would be sufficient to measure the flow in one of the connecting lines 35.

The piston rod 18 may be coupled to a length measurement device in order to precisely measure the speed of the piston 15 independent of pitch errors of the threaded spindle 28.

A metering device for producing a precisely metered volumetric flow is provided that includes two displacement devices that are operated in phase opposition. In this case, the shifting speeds of the volumes of the displacement devices are adjusted such that no compensation flow takes place. In this state, the volumetric flow delivered to the device to be tested is identical to the volumetric flow taken in by the other displacement device from the pressure source.

What is claimed is:

1. A volumetric flow metering device (1) for delivering a defined volumetric flow of a fluid to a load at a predetermined pressure comprising:
    a supply line for the fluid;
    a pressure gauge;
    a first displacement device connected to the supply line;
    a second displacement device in fluid communication with the first displacement device via a connecting line;
    a feed line that leads from the second displacement device to the load;
    a differential pressure measuring device or a flowmeter in the connecting line; and
    a drive unit coupled to the first and second displacement devices in such a way that free volumes of the two displacement devices are changed by a same amount in opposite directions.

2. A volumetric flow metering device according to claim 1, wherein the pressure gauge is arranged in the supply line or the feed line leading to the load (2).

3. A volumetric flow metering device according to claim 1, wherein at least one of the first and the second displacement device contains a cylinder and a displacement piston leads into the cylinder and is sealed at an end of the cylinder such that the free volume of the cylinder is variable.

4. A volumetric flow metering device according to claim 3, wherein a free width of the cylinder is larger than the diameter of the displacement piston.

5. A volumetric flow metering device according to claim 3, wherein the displacement piston has a constant cross section over its entire effective length.

6. A volumetric flow metering device according to claim 3, wherein the cylinder has a constant cross section over its entire length.

7. A volumetric flow metering device according to claim 1, wherein the connecting line, the supply line and the feed line are connected to the cylinder and lead into the cylinder at different ends thereof.

8. A volumetric flow metering device according to claim 1, wherein the first and the second displacement devices each contain a cylinder and a displacement piston that leads into the respective cylinder and wherein the displacement pistons of the first and second displacement devices are mechanically coupled to one another.

9. A volumetric flow metering device according to claim 1, wherein the first and the second displacement devices each contain a cylinder and a displacement piston that leads into the respective cylinder and wherein the displacement pistons of the first and second displacement devices are configured as a single piece.

10. A volumetric flow metering device according to claim 1, wherein the wherein the first and the second displacement devices each contain a cylinder and a displacement piston that leads into the respective cylinder and wherein the cylinders of the first and second displacement devices transition into one another and the displacement pistons of the first and second displacement devices transition into one another.

11. A volumetric flow metering device according to claim 10, wherein free ends of the common piston for both displacement devices are respectively provided with a rod that extends through an end of the respective cylinder in a sealed manner.

12. A volumetric flow metering device according to claim 1, wherein the volumetric flow metering device is arranged in a sealed housing.

13. A volumetric flow metering device according to claim 1, wherein the drive unit includes a stepper motor or a synchronous motor.

14. A volumetric flow metering device according to claim 1, wherein at least one of the first and the second displacement devices contains a cylinder and a displacement piston that leads into the cylinder and a length measuring device is provided for measuring the stroke or the speed of the displacement piston.

15. A volumetric flow metering device according to claim 1, wherein a shut-off valve is arranged in the connecting line.

* * * * *